Nov. 13, 1951     J. R. HULSE     2,575,171
TRAILER HITCH
Filed July 14, 1947
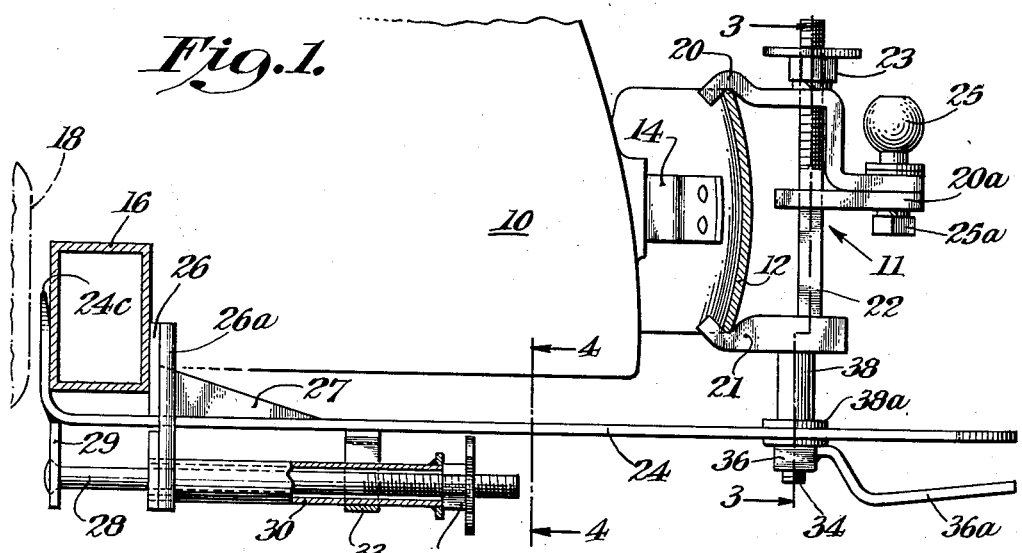
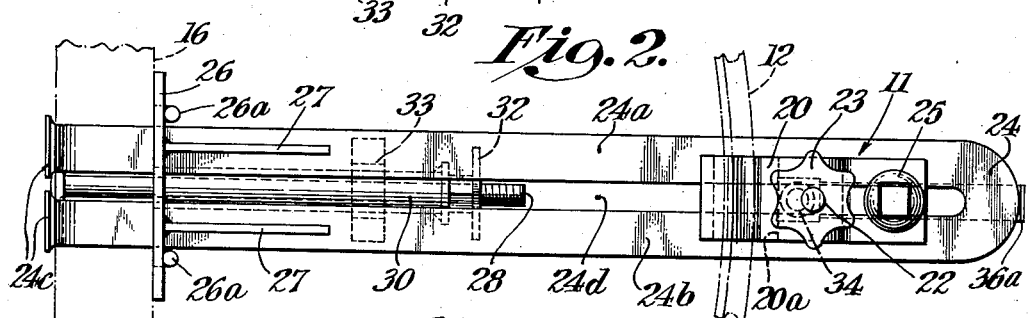
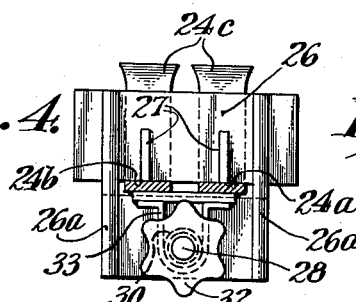
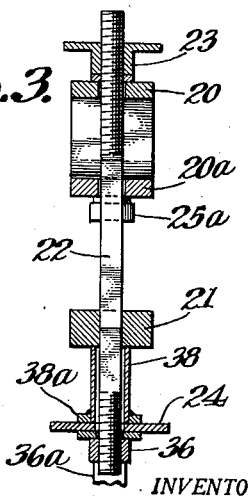
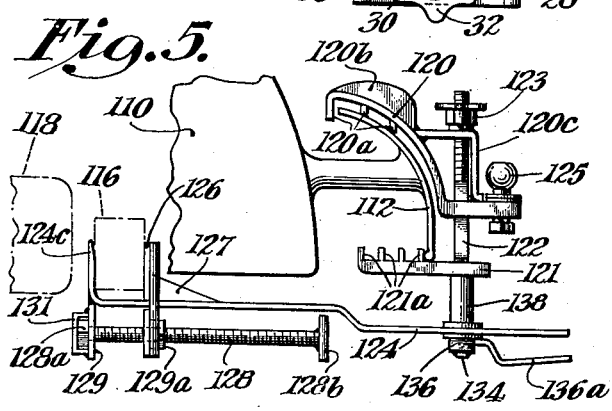
INVENTOR.
John R. Hulse
BY Nathaniel Ely
ATTORNEY Patented Nov. 13, 1951

2,575,171

UNITED STATES PATENT OFFICE 2,575,171

TRAILER HITCH

John R. Hulse, Dover, N. J.

Application July 14, 1947, Serial No. 760,726

4 Claims. (Cl. 280—33.44)

This invention relates to improvements in trailer hitches, particularly of a demountable type for use on automobiles.

The increasing use of trailers for pleasure and business purposes has developed a need for a safe, simple and easily attachable and detachable hitch that will not deface nor mar the towing vehicle and which will give that strength of attachment which only permanent forms have heretofore made possible. In fact, certain State governments have found it necessary, in prescribing minimum regulations for safety of the highway, to refuse authorization for the use of many common types of trailer hitch. It is essential that the accident rate from the use of trailers be materially reduced.

One of the objects of my invention is to provide a detachable trailer hitch that can be quickly applied to or removed from an automobile or truck and which will have direct draft means engaging the chassis of the vehicle so that both forward as well as rearward draft of the trailer is taken directly by the frame of the towing vehicle.

A further object of my invention is to provide a universal type of positive draft trailer hitch adaptable to the small passenger vehicle so that a trailer may be temporarily secured thereto, the trailer hitch being quickly removable from the vehicle when its use is completed.

Further objects and advantages of my invention will appear from the following description of preferred forms of embodiment thereof, taken in conjunction with the drawings attached hereto, and in which:

Fig. 1 is a schematic side elevation of one form of trailer hitch for attachment to the car frame and bumper, both being shown in cross section;

Fig. 2 is a top plan view of the hitch shown in Fig. 1;

Fig. 3 is a detailed vertical cross section taken substantially on the line 3—3 of Fig. 1;

Fig. 4 is a vertical section of the hitch anchor to the frame taken along the line 4—4 of Fig. 1;

Fig. 5 is a view similar to Fig. 1 showing a modified form of attachment.

In accordance with my invention, I have schematically illustrated the rear portion of a motor vehicle, as of the passenger type, having the body portion 10, to the rear of which is a typical bumper 12 secured by brackets 14 in the customary manner. The vehicle also has a typical transverse frame member as generally illustrated by the hollow box 16. In some cases, this member is frequently of I beam or channel shape. It is usually placed rearward of the gasoline tank shown in dotted lines at 18 and it extends between longitudinal frame members, not shown. It is thus a structural part of the vehicle chassis.

The customary trailer hitch, generally shown at 11, is secured as a rule to the bumper 12 as by clamping jaws 20 and 21 which are drawn together by means of hitch bolt 22 and hand wheel 23. One of the jaws (shown here as the upper jaw) usually has the ball pivot block 25 which may be integral with or detachable from the jaw as by stud 25a. The pivot 25 is usually set outward of the jaw body so that the towing rig, not shown, can be readily engaged over it. A guide member 29a may be used to hold the pivot in its plane. As will be apparent, the ball 25 is usually a hardened steel member which permits the necessary knuckle movement of the trailer rig in the different planes and is adapted to sustain direct tension and compression loads due to the starting and stopping of the towing vehicle.

As suggested, in the past this draft has been sustained entirely by the bumper 12. As a result, many accidents have occurred due to sudden stopping or starting as the bumper is usually of spring metal and in any event, the brackets 14 permit considerable movement of the bumper under load. Usually the trailer coupling breaks under this sudden action and the trailer is no longer under control. The seriousness and frequency of these accidents has been cause for alarm.

My invention avoids the foregoing difficulties by establishing a direct draft connection between the towing pivot block 25 and the frame member 16. This is accomplished in the first form of embodiment through the draft member 24 which may be of a substantial bar construction such as rolled steel having the U-shaped configuration shown in Fig. 2. This results in two legs 24a and 24b, the inner extremities of which are turned up at 24c to engage the inner side of frame member 16.

Carried by the draft member 24 near the inner end is a frame clamping device consisting of an upwardly extending complementary jaw 26 which is movable toward and away from the fixed extremities 24c of the draft member. This is effectively accomplished by long bolt 28 carried by a bracket 29 dependent from the draft member 24 near its inner end, such bolt having a sleeve 30 and hand wheel nut arrangement 32 threaded on the bolt. The inner end of the sleeve 32 engages the lower end of jaw 26 so that by turning the hand wheel 32 in one direction, the jaw 26 will close firmly against the frame member 16 reacting against draft bar members 24c. A turn in the opposite direction, will, of course, loosen the device.

The jaw 26 is slotted to slide on the bars 24a and 24b or may be made of two parts integrated by members 26a. Reenforcing brackets 27 may also be used to prevent bending of the jaw 26 under load.

The purpose of the sleeve 30 is to render the attachment more easily accomplished from the rear of the vehicle. The strap 33 tends to hold the bolt extension and sleeve from rattling.

Having fixed the inner end of the draft member 24 to the frame member 16 in a secure manner, the draft member 24 is attached to the trailer hitch 11 as follows. A bolt 34 which may be an extension of bolt 22, extends from the lower jaw 21 through the slot 24d in the bar 24. A clamp nut 36 and lock washer are carried by this bolt, and having a long arm 36a, the draft bar 24 is readily locked to the hitch bolt 22. If necessary, an extension sleeve 38 may be used to accommodate the relative vertical positions of the draft bar 24 with respect to the trailer hitch clamps 20 and 21 depending upon the relative body shapes 10, the location of the cross frame member 16 and the location of the bumper 12. If desired, the upper face of the draft members 24a and 24b may have transverse serrations and the cooperating face 38a of the extension sleeve 38 may be similarly serrated to form a non-slipping connection when the parts are clamped together.

*Method of application (attachment)*

In order to attach the draft gear to a vehicle, hand wheel 23 of the hitch clamp adjustment is loosened so that the jaws 20 and 21 will fit over the bumper. Clamp 36 of the draft bar length adjustment is loosened to permit the necessary lateral adjustment of the draft bar and hand wheel 32 of the frame clamp adjustment is loosened to permit jaw 26 and end pieces 24c to embrace the cross frame member 16.

As the first step, the upper trailer hitch jaw 20 is hung on the bumper 12. The draft bar 24 is then moved to engage the end pieces 24c on the inside of the frame member 16. If necessary, the bolt or stud 34 is slid in or out along the draft bar 24 to make a relatively right angular relation. The hand wheel 32 on the frame clamp adjustment is then tightened to firmly attach the draft member to the frame.

As the second step, the trailer hitch clamps 20 and 21 are made tight on the bumper 12 by securing the hand wheel 23 on the bolt or stud 22. By this action, the relatively unflexed position of the bolt 34 and draft member 24 is automatically established. The clamp nut 36 is then secured to form an integral unit.

Removal of the hitch is accomplished in the reverse order.

Ordinarily the spacing between the cross frame member 16 and the gasoline tank 18 and between the cross frame member 16 and other parts of the vehicle, such as the rear axle housing, make it important that the inner ends 24c of the draft member be carefully proportioned so that the hitch may be quickly applied and removed. Ordinarily time is of the essence, especially where the hitches are rented on an hourly basis.

A modified form of construction is shown in Fig. 5, such form being adapted to a greater variety of vehicles including those having extraordinary bumpers. In this case, the vehicle body is shown at 110 and the modified form of bumper is indicated at 112. The gasoline tank is 118 and the upper jaw of the trailer hitch is 120. It has a series of steps or gripping portions 120a and may have a central reenforcing rib 120b. It also preferably has an integral reenforcing bracket member 120c and it carries the typical ball pivot member 125.

The lower jaw 121 has a series of cooperating steps or grips 121a to engage under varied styles of bumpers. The jaws are closed by hand wheel 123 on stud 122 and the stud may have an extension portion 134 on which is preferably an extension sleeve 138 as in the prior form. The draft member 124 carried by this extension portion 134 to which it is secured by clamp 136 engages the cross frame member 116 by means of the upturned ends 124c as in the prior case. Jaw 126 in this case is moved by a slightly different bolt arrangement.

In this case, jaw 126 has a nut 129a welded to it and the bolt 128 which is threaded through the nut 129a also extends through an unthreaded aperture in bracket 129. The bolt has a head 128a and a hand hold or cross bar 128b. As the bolt is turned, the head end freely rotating in bracket 129, it will advance or retract nut 129a and thus move the jaw 126 in the desired direction.

It will be apparent that this form of construction makes it possible to apply a single form of hitch to many varieties of body, vehicle and bumper shapes. It is also possible to use a standard form of hitch for a particular type of vehicle for most all of any one of the three popular priced cars have the same relation of parts (bumper, cross frame member and body extension). In such case the draft length adjustment could be eliminated and a simple attachment for direct fore and aft draft on the body and support by the bumper could be established. In general, however, I find it necessary to have at least the trailer hitch adjustment to the bumper and the detachable clamp adjustment to the cross frame member.

While I have shown and described preferred forms of embodiment of my invention, I am aware that modifications may be made thereto and I therefore desire to include such modifications as come within the scope and spirit of the description herein and of the claims appended hereinafter.

I claim:

1. A universal detachable trailer hitch for quick attachment and detachment to different towing vehicles having a bumper and a transverse chassis member inwardly spaced from the rear of the vehicle, said trailer hitch comprising a knuckle ball, cooperating clamping jaws adapted to engage the bumper and position the knuckle ball, adjustable screw means including a hitch bolt to force said bumper clamping jaws into bumper engaging position, a rigid draft member extending longitudinally of the vehicle from a point adjacent the chassis cross member to a position adjacent the adjustable screw means for the bumper clamping jaws, said draft member having a fixed face and carrying a relatively movable member with an opposing face, adjustable locking means to fixedly position said opposing faces in contact with the fore and aft faces of the chassis cross member to transmit fore and aft draft loads thereto, and an adjustable clamp engaging the hitch bolt and the adjacent end of the draft member whereby draft loads on the knuckle ball will be positively resisted by the chassis member, said trailer hitch being removable from the vehicle by the loosening of the chassis member engaging clamping faces and the loosening of the bumper engaging clamps.

2. A hitch as claimed in claim 1 in which the adjustable locking means to fixedly position the draft member to the chassis cross member includes a screw carried by the draft member, and a travelling nut carried by the screw and engaging the movable member, said screw extending toward the rear of the vehicle a distance substantially greater than the range required for adjustment and a sleeve carried by said screw between said nut and said movable face whereby adjustment can be accomplished from the rear of the vehicle.

3. In combination with a knuckle ball trailer hitch having adjustable jaws to detachably engage a rear part of a towing vehicle whereby the knuckle ball may be supported in a desired position, a rigid draft member to take fore and aft draft on said hitch, said draft member having adjustable clamping faces adapted to engage the fore and aft faces of a transverse chassis member spaced forward of the hitch supporting vehicle part, said hitch having a hitch bolt extending transversely of the draft member adjacent the outer end thereof, said draft member extending laterally with respect to the hitch bolt, and a clamp to hold the hitch bolt and outer end of the draft member in a desired relative position after the end of the draft member is secured to the chassis member, said clamp being adapted to transmit thrust on said knuckle ball to said transverse chassis member.

4. The combination as claimed in claim 3 in which the draft member is longitudinally slotted and the hitch bolt has a screw threaded extension extending through the slot and the clamp is carried by the extension piece and engages one side of the draft member.

JOHN R. HULSE.

REFERENCES CITED

The following references are of record in the file of this patent:

UNITED STATES PATENTS

| Number | Name | Date |
|---|---|---|
| 1,535,397 | Buffington | Apr. 28, 1925 |
| 1,537,249 | Manley | May 12, 1925 |
| 2,097,006 | Weis | Oct. 26, 1937 |
| 2,306,007 | Thorp | Dec. 22, 1942 |
| 2,342,907 | Stall | Feb. 29, 1944 |